United States Patent
Black et al.

(10) Patent No.: US 8,688,698 B1
(45) Date of Patent: Apr. 1, 2014

(54) AUTOMATIC TEXT SUGGESTION

(75) Inventors: David Black, Rego Park, NE (US);
Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/025,963

(22) Filed: Feb. 11, 2011

(51) Int. Cl.
*G06F 17/30* (2006.01)

(52) U.S. Cl.
USPC ............ 707/732; 707/708; 707/751; 707/765

(58) Field of Classification Search
USPC .................................. 707/708, 732, 751, 765
See application file for complete search history.

(56) References Cited

U.S. PATENT DOCUMENTS

| | | | |
|---|---|---|---|
| 6,377,965 B1 * | 4/2002 | Hachamovitch et al. | 715/203 |
| 7,657,423 B1 * | 2/2010 | Harik et al. | 704/9 |
| 7,890,526 B1 * | 2/2011 | Brewer et al. | 707/767 |
| 2009/0077037 A1 * | 3/2009 | Wu et al. | 707/3 |

\* cited by examiner

*Primary Examiner* — Sangwoo Ahn
(74) *Attorney, Agent, or Firm* — Fish & Richardson P.C.

(57) ABSTRACT

Methods, systems, and apparatus, including computer programs encoded on a computer storage medium, for automatic text suggestion are described. In general, one aspect of the subject matter described in this specification can be embodied in a method that includes, from an authoring environment, receiving a request to supplement a text segment; submitting a query to a search engine, the query being generated from the text segment; receiving multiple search results from the search engine in response to the query, each search result including an information snippet; generating one or more suggestions for supplementing the text segment based on the information snippets; and providing the one or more suggestions for supplementing the text segment for display in the authoring environment.

28 Claims, 4 Drawing Sheets

AUTOMATIC TEXT SUGGESTION

BACKGROUND

This specification relates to word processing.

When a writer writes a word or a phrase in a word processor, the writer may desire that the word or phrase be automatically completed by the word processor. Various conventional word processors include "word complete" or "spell check" features. For example, when a writer is uncertain about the spelling of a word, the writer may write a few letters of the word based on what the writer remembers. The word processor can automatically complete the rest of the word. The word processor may use a built-in dictionary for providing the automatic completion.

SUMMARY

In general, one aspect of the subject matter described in this specification can be embodied in a method that includes, from an authoring environment, receiving a request to supplement a text segment; submitting a query to a search engine, the query being generated from the text segment; receiving multiple search results from the search engine in response to the query, each search result including an information snippet; generating one or more suggestions for supplementing the text segment based on the information snippets; and providing the one or more suggestions for supplementing the text segment for display in the authoring environment.

These and other embodiments can optionally include one or more of the following features. The request includes a specified string of characters. Generating the one or more suggestions based on the information snippets includes generating one or more candidate suggestions from each information snippet; calculating a relation score for each of the one or more candidate suggestions; and generating the one or more suggestions from the candidate suggestions according to the relation score. Calculating the relation score includes calculating the relation score based on at least one of a length of each candidate suggestion; a frequency at which the candidate suggestion appears in the information snippets; or a history of the candidate suggestion being selected by a user to supplement the text segment.

In some implementations, the one or more suggestions consist of one particular suggestion. Providing the one or more suggestions for supplementing the text segment for display includes supplementing the text segment using the particular suggestion. In some implementations, providing the one or more suggestions for supplementing the text segment for display can include providing the one or more suggestions for display in a selection interface, the one or more suggestions being sorted in the selection interface using the relation score; receiving a user selection of a particular suggestion from among the one or more suggestions displayed in the selection interface; and supplementing the text segment using the particular suggestion. Supplementing the text segment can include inserting the particular suggestion into a specified position relative to the text segment.

The method can further include learning from the user selection, including increasing a relatedness value between the text segment and the particular suggestion, the relatedness value to be used in future calculations of relation scores. The one or more suggestions include at least one of a proper name, a date, or a number.

Particular embodiments of the subject matter described in this specification can be implemented to realize one or more of the following advantages. A system can automatically provide suggestions that supplement an initial portion of text a writer is writing when the writer cannot remember a fact or an idiom to continue. The suggestions can include words, phrases, or sentences. Thus, the system can allow the writer to continue writing without leaving an authoring environment to consult a dictionary, almanac, encyclopedia, or a search engine.

The system can provide automatic fact checking. When a writer writes content that includes a statement contradicting statements from a large number of resources, the system can prompt the writer to double-check the statement. For example, if the writer writes, "The World Wide Web was invented by Tim Berners-Lee and Robert Metcalfe," a word editor utilizing the automatic text suggestion techniques can highlight the word "Metcalfe" to alert the writer that there might be an error.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
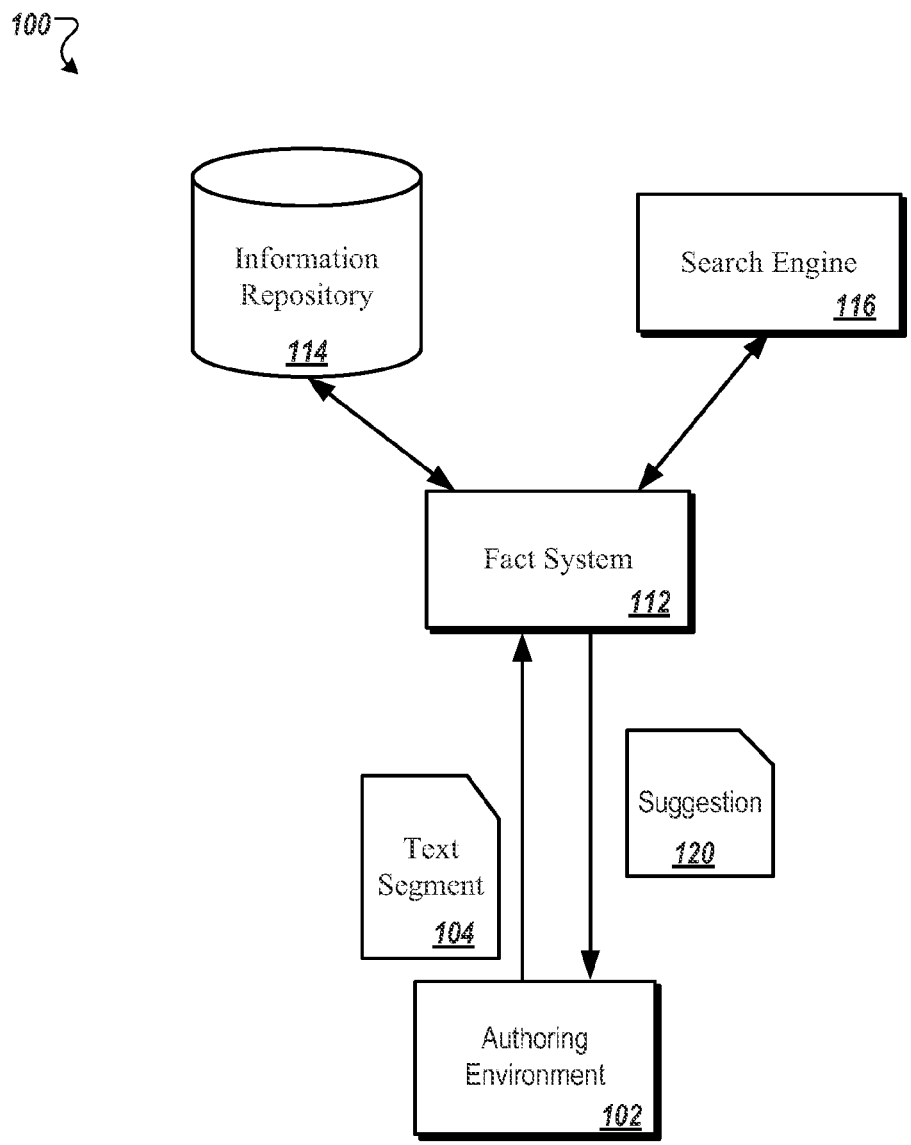
FIG. 1 is a block diagram illustrating an example system implementing automatic text suggestion techniques.

FIG. 1 is a block diagram illustrating an example system 100 implementing automatic text suggestion techniques. The system typically includes an authoring environment 102, and a suggestion system 112, which provides text suggestion services to the authoring environment 102. In some implementations, the authoring environment 102 can be provided by a user device that is connected to the suggestion system 112 through a communications network.

The authoring environment 102 includes a text editor for receiving textual inputs. The authoring environment 102 receives and processes free-form text entries and text edits. The authoring environment 102 is also configured to receive an input indicating that a user is seeking a supplement to a text segment 104 that has been entered in the text editor. Upon receiving the input, the authoring environment 102 sends a request to the suggestion system 112. The request includes the text segment 104.

Upon receiving the request that includes the text segment 104, the suggestion system 112 submits a query to a search engine 116. The query can include at least a portion of the text segment 104 as query terms. In response, the suggestion system 112 receives one or more query results. Each query result can include an information snippet. The suggestion system 112 selects one or more of the information snippets, and performs analysis on the information snippets to determine one or more suggestions 120 for supplementing the text segment 104. Suggestions 120 include one or more text strings for supplementing the text segment 104.

The analysis performed by suggestion system 112 includes calculating a likelihood that a suggestion is going to be selected by a user based on internal structures of the information snippets and on a history of past user selections as stored in information repository 114. Further details on the analysis performed on the information snippets will be described below in reference to FIG. 2B.

The suggestion system 112 provides the one or more suggestions 120 to the authoring environment 102. When one suggestion 120 is provided, the authoring environment 102 can supplement the text segment 104 automatically using the suggestion 120. When multiple suggestions 120 are provided, the authoring environment 102 can provide a selection input for receiving a user selection of one of the suggestions, or a user rejection of all suggestions. In some implementations, the authoring environment 102 submits the user selection or rejection to suggestion system 112, which can store the user selection or rejection in information repository 114 to be used in future analysis of information snippets.

The following example illustrates features and operations of system 100. The authoring environment 102 receives typed or pasted text content. The text content can be a word, a phrase, a portion of a sentence, a sentence, a paragraph, or a document. For example, the authoring environment 102 receives the following text content: "According to most historians, the World Wide Web was invented," which has been typed or pasted into the authoring environment 102.

The authoring environment 102 receives an input indicating that a user of the authoring environment 102 seeks information to supplement text segment 104 in the text content. Upon receiving the input, the authoring environment 102 sends a section of the text content (e.g., "World Wide Web was invented") to suggestion system 112. In response, suggestion system 112 returns three suggestions: "by Tim Berners-Lee," "on Dec. 25, 1990," and "at CERN." The authoring environment 102 can present the three suggestions in a selection user interface (e.g., a pop-up menu). Upon receiving a selection in the user interface, the authoring environment 102 can supplement the text content using the selected suggestion, such that the text content reads, for example, "According to most historians, the World Wide Web was invented by Tim Berners-Lee." The details of supplementing a text segment are described below in reference to FIGS. 2A and 2B.

Figure 2A:
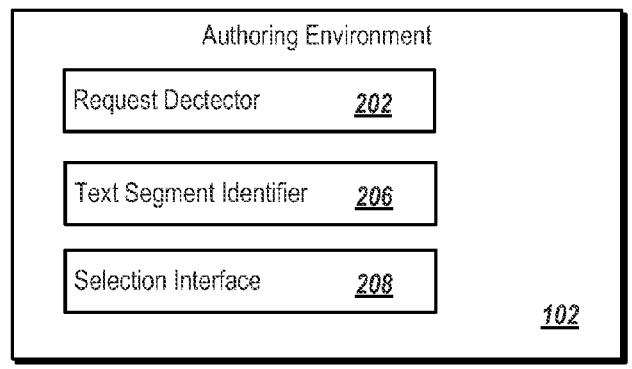
FIG. 2A is a block diagram illustrating an example architecture of an authoring environment implementing automatic text suggestion techniques.

FIG. 2A is a block diagram illustrating an example architecture of authoring environment 102 implementing automatic text suggestion techniques. The authoring environment 102 can include a text editor 210. The text editor 210 can include a stand-alone word processing program or a server-supplied text editing program. The server-supplied text editing program can include a browser-based editor. The server can be the suggestion system 112 of FIG. 1.

The authoring environment 102 includes a request detector 202. Request detector 202 is a software module that is configured to detect a user input requesting automatic text suggestion. The request detector 202 includes a plug-in (also known as an add-on) to the text editor 210. The plug-in includes a computer program configured to interact with the word processing program or the server-supplied text editing program to provide text suggestion services. In some implementations, the request detector 202 is a script (e.g., a JavaScript® program) that can be executed by a web browser.

In some implementations, the request detector 202 is configured to detect a pause of typing before a punctuation mark is entered or a carriage return is pressed. If a writer types a sentence, pauses before typing a punctuation mark such as a period ("."), and pauses for a threshold length of time (e.g., three seconds), the request detector 202 proceeds to submit a request to a suggestion system to supplement the text being typed by the writer.

In some implementations, the request detector 202 is configured to detect a specified sequence or combination of key strokes typed in by the writer. The key strokes can include letters, numbers, or punctuation marks. For example, the request detector 202 can be configured to designate a string of three question marks ("???"), typed consecutively, as an input indicating a request for automatic text suggestion.

The request detector 202 can be configured to accept user defined key stroke sequences or combinations. For example, the request detector 202 can be configured to accept a sequence "????" or "\\\" or a key combination as an input for requesting automatic text suggestion, if a writer sometimes uses "???" in actual writing.

The authoring environment 102 includes a text segment identifier 206. Text segment identifier is a software module that identifies a text segment to supplement from among multiple text segments. In some implementations, the text segment is a user selected portion of text content being edited in the authoring environment 102. In some implementations, the segment identifier 206 automatically detects a portion of the text content and designates the detected portion as the text segment to be supplemented. For example, the text segment identifier 206 can select the last n words typed by the writer (e.g., "World Wide Web was invented" when using the example of FIG. 1 and when n=5), the words after a last punctuation mark (e.g., "the World Wide Web was invented"), or the words from the beginning of the sentence currently being typed (e.g., "According to most historians, the World Wide Web was invented").

The authoring environment 102 includes a selection user interface 208 that is configured to provide for display multiple suggestions from the server. Further details on the selection user interface 208 will be described below in reference to FIG. 3.

Figure 2B:
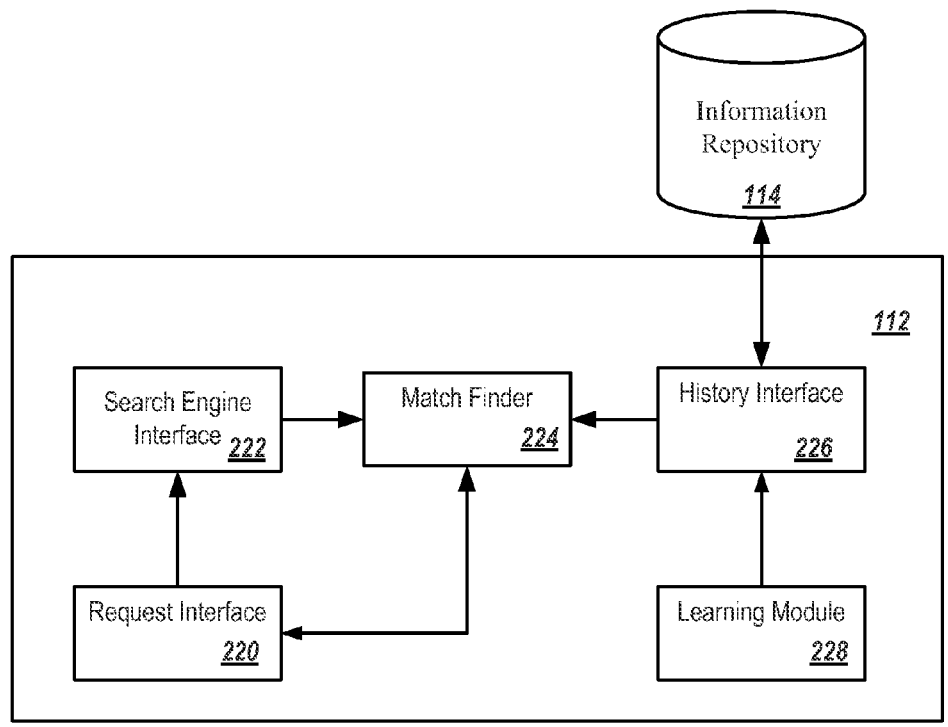
FIG. 2B is a block diagram illustrating an example architecture of a suggestion system implementing automatic text suggestion techniques.

FIG. 2B is a block diagram illustrating an example architecture of suggestion system 112 implementing automatic text suggestion techniques. Suggestion system 112 includes request interface 220 that is configured to receive a request to supplement a text segment from an authoring environment (e.g., the authoring environment 102 of FIG. 1 and FIG. 2A) and to provide suggestions for supplementing the text segment to the authoring environment.

Suggestion system 112 includes a search engine interface 222 that can submit a query to a search engine, receive search results from the search engine, and select information snippets from the search results. The search engine interface 222 is configured to submit at least a portion of the text segment received by request interface 220 to the search engine. The portion of the text segment can be normalized. The search engine interface 222 is also configured to receive multiple search results from the search engine. Each search result can include a uniform resource locator (URL) link to an information source and an information snippet providing a summary of the information source. Some examples of the information snippets included in the returned results are listed below.

In the 1980's, the World Wide Web was invented by Tim Berners-Lee and Robert Cailliau in Europe . . . .

World Wide Web was invented on Dec. 25, 1990 . . . .

The World Wide Web was first invented at CERN . . . .

The search engine interface 222 can select multiple information snippets from the search results. The selection can be based on a rank provided by the search engine. For example, the search engine interface 222 can select information snippets from 30 top-ranked search results.

The suggestion system 112 includes suggestion finder 224 that identifies one or more suggestions from the selected information snippets. The suggestion finder 224 evaluates the selected information snippets in reference to the text segment to determine what parts of the information snippets are most likely to be helpful to the writer. An example information snippet retrieved from search engine is: "In the 1980's, the World Wide Web was invented by Tim Berners-Lee and Robert Cailliau in Europe." The suggestion finder 224 identifies a first portion of the information snippet (e.g., "the World Wide Web was invented") that matches the text segment and a second portion that includes a non-matching string. The non-matching string is a string that does not semantically match the text segment. In the examples above, the non-matching strings include "by Tim Berners-Lee and Robert Cailliau in Europe," "on Dec. 25, 1990," and "at CERN."

In some implementations, the non-matching string includes a section of an information snippet that starts from the end of the first portion of an information snippet. The non-matching string can end at the end of the information snippet or end at a specified token. The specified token can include a pre-specified and configurable punctuation mark (e.g., a semicolon or carriage-return character), or a tag. The tag can include a closing tag in a hyper-text markup language (HTML) document. In some implementations, the non-matching string is located at a part of the information snippet that corresponds to a position of the input requesting for suggestion, where the position of the input is relative to the text segment. For example, the suggestion finder 224 can identify "Tim Berners-Lee" as the non-matching string in an information snippet "Tim Berners-Lee invented the World Wide Web" retrieved by search engine interface 222, when a writer types "??? invented the World Wide Web."

The suggestion finder 224 provides at least one of the non-matching strings as a suggestion. If there are multiple non-matching strings, the suggestion finder 224 ranks the non-matching strings and provides the non-matching strings as suggestions according to the ranking. The suggestion finder 224 ranks the non-matching strings based on a relation score calculated for each non-matching string. The relation score is a value that represents a likelihood that the non-matching string, if suggested to a user, will be selected by the user to supplement the text segment.

The suggestion finder 224 can calculate the relation score based on a length of the non-matching string, a popularity of the non-matching string, a past selection history of the non-matching string, or any combination of the above. In some implementations, the suggestion finder 224 calculates a value L of a non-matching string (e.g., "by Tim Berners-Lee and Robert Cailliau in Europe") using the length of the string. The length can be measured in a count of bytes, a count of characters, a count of words, or a combination of the above. The value L includes a normalized length. The value L can be a component of the relation score.

In some implementations, the relation score has a component P, which is a value of a non-matching string calculated based on a popularity of the non-matching string. The suggestion finder 224 can calculate the popularity using a count of occurrences that the non-matching string appears in the selected information snippets. In some implementations, the suggestion finder 224 calculates a value H for a string. The value H measures a number of times the non-matching string has been selected by a user to be associated with the text segment in the past when the string was presented as a suggestion to supplement the text segment. The suggestion finder 224 can weigh and combine various values to generate a relation score, for example, by using formula $R=aL+bP+cH$, where R is the relation score and a, b, and c are weights of the values L, P, and H, respectively. The suggestion finder 224 can rank the strings based on the relation score of each string, and provide some or all of the strings (e.g., those ranked at the top) as suggestions.

Suggestion system 112 includes history interface 226 that provides interface to an information repository 114. The information repository 114 can store history learned from past selections of suggestions by multiple users, and the frequency of the user selections. This data in the history can be aggregated or otherwise anonymized. For example, the information repository 114 stores information indicating that the suggestion "by Tim Berners-Lee" has been selected as a supplement to a text segment "World Wide Web was invented" x number of times, whereas the suggestion "on Dec. 25, 1990" has been selected y number of times. Suggestion finder 224 can use the stored information, including the values x and y, to determine whether to suggest "by Tim Berners-Lee" or "on Dec. 25, 1990," or both, and in what order, in response to a next request. In some implementations, the suggestion that has been selected most frequently in the past is ranked highest as a suggestion in response to the next request. A learning module 228 of suggestion system 112 collects user selections and provides the user selections for storage in information repository 114 through history interface 226.

In some implementations, request interface 220 can be configured to receive a "fact check" request that seeks to identify potential inaccuracies in a sentence. A potential inaccuracy can be identified based on a statement that contradicts statements from multiple sources. For example, request interface 220 can receive the following text segment and a fact check request: "The World Wide Web was invented by Tim Berners-Lee and Robert Metcalfe." The section "Tim Berners-Lee and Robert Metcalfe" is highlighted or otherwise marked for fact checking. Suggestion finder 224 can determine that none of the most popular information snippets retrieved through search engine interface 222 contains a first portion that matches "The World Wide Web was invented" and a second portion that matches "by Tim Berners-Lee and Robert Metcalfe." Rather, some information snippets contain a second portion that reads "by Tim Berners-Lee and Robert Cailliau," which is similar to the received sentence. Suggestion finder 224 can provide a hint through request interface 220, for example, in the form of a popup window in an authoring environment. The popup window can contain a prompt "Did you mean 'by Tim Berners-Lee and Robert Cailliau'?" where the potential factual conflict "Cailliau" is highlighted or otherwise emphasized. The writer can then choose to keep or change the writer's writing in light of the prompt.

Figure 3:
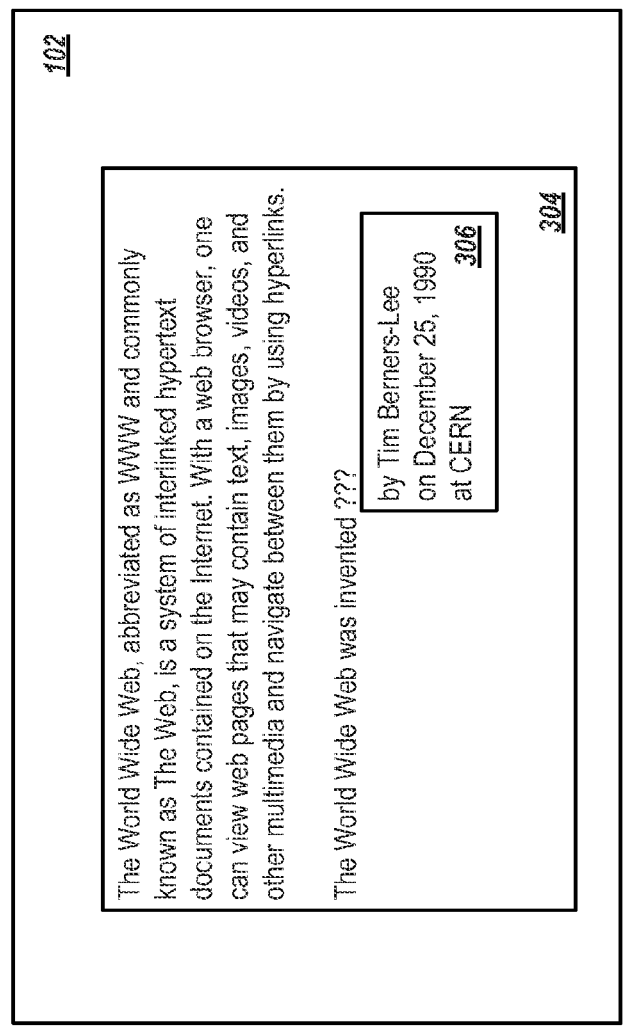
FIG. 3 illustrates an example user interface of an authoring environment implementing the automatic text suggestion techniques.

FIG. 3 illustrates an example user interface of an authoring environment implementing the automatic text suggestion techniques. The example user interface can be implemented on a client computer that a user uses to write.

A window 304 of an authoring environment 102 is displayed on a display device. For simplicity, controls of the authoring environment 102 are omitted. The window 302 includes a text area into which a writer can type text content. The authoring environment 102 receives part of a sentence, e.g., "The World Wide Web was invented," typed or pasted by the writer. The authoring environment 102 then receives an input (e.g., a string "???") indicating that the writer seeks suggestion to complete the sentence. Upon receiving the input, the authoring environment 102 feeds the part of the sentence that is already written ("The World Wide Web was invented") to a suggestion system and receives three suggestions in response ("by Tim Berners-Lee," "on Dec. 25, 1990," and "at CERN"). The three suggestions are displayed in a selection interface 306, and sorted based on relation scores calculated for the suggestions. The writer can select any of the three facts, or ignore the facts and continue writing the sentence. The selected fact can replace the input "???" in the sentence. It is possible that the authoring environment 102 receives only one suggestion. In such cases, the authoring environment 102 can automatically replace the input "???" in the sentence with the suggestion without providing the selection interface 306.

In some implementations, the authoring environment 102 can be configured to operate in batch mode. In batch mode, the authoring environment 102 withholds submitting an input to a suggestion system until the authoring environment 102 receives a confirmation. Thus, multiple text suggestion requests can be made substantially simultaneously. For example, a writer types a string "???" whenever the writer is uncertain about a fact. The authoring environment 102 creates and stores a request each time the authoring environment 102 receives the string "???." The authoring environment 102 submits the stored request to a suggestion system (e.g., a server device) in batch. The suggestion system can process the requests serially, for example, by presenting a second suggestion for supplementing a second text segment after the writer has selected a first suggestion for supplementing a first text segment. Alternatively or additionally, the server can process the sentences in parallel, for example, by presenting multiple suggestions for multiple text segments substantially simultaneously in window 304.

In some implementations, the text editor can detect the string "???" located at various positions of a body of text (e.g., the beginning of a sentence, in the middle of the sentence, or at the end of the sentence). For example, a writer can type the following sentence: "??? was created by Robert Metcalfe." The writer submits a request for text suggestion. In response to the request, the server returns one or more suggestions, for example, "The Ethernet" and "3Com." The suggestions are displayed in window 304 at a position that corresponds to the position of "???"—in this example, at the beginning the sentence.

Figure 4:
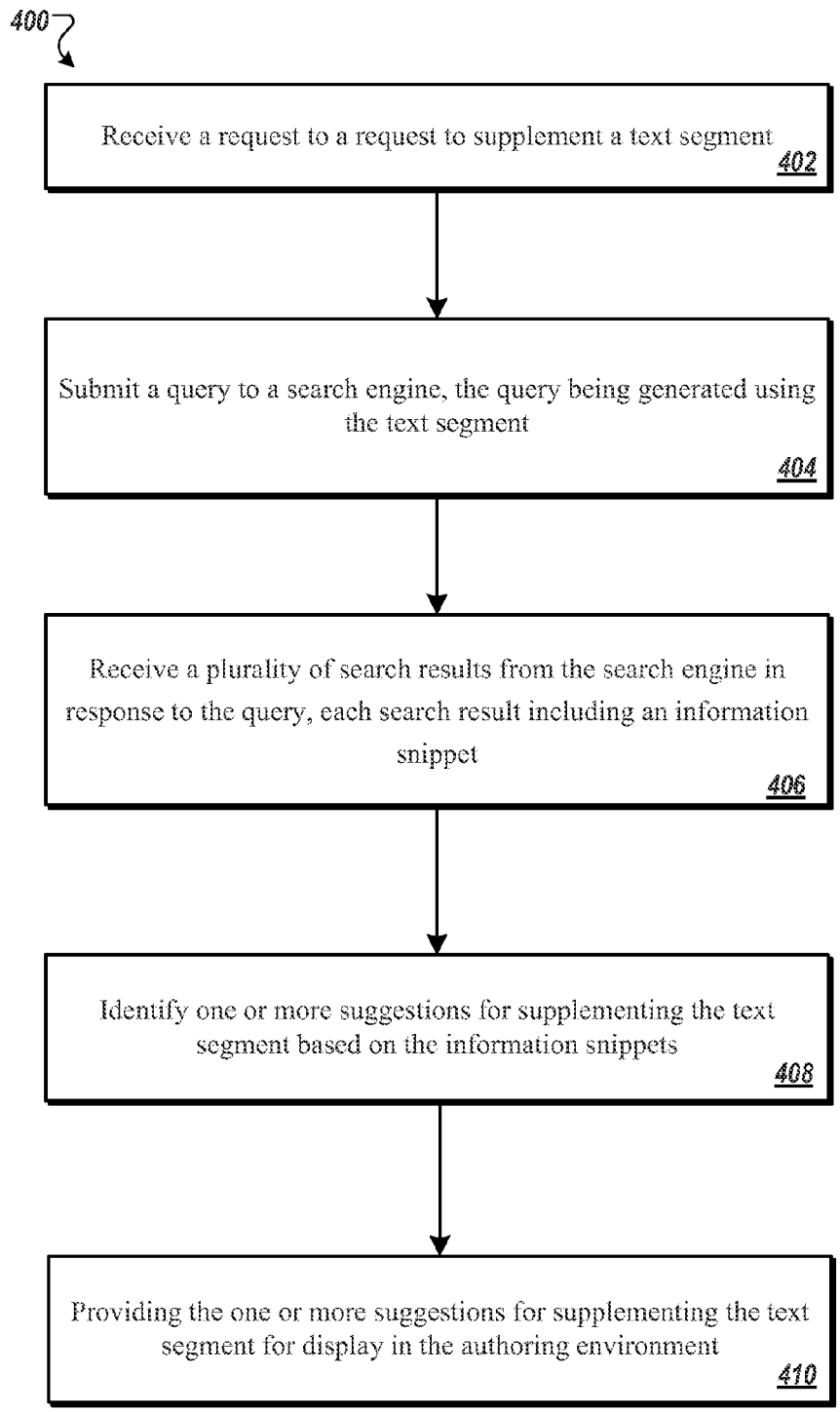
FIG. 4 is a flowchart illustrating an example process of automatic text suggestion.

FIG. 4 is a flowchart illustrating an example process 400 of automatic text suggestion. For convenience, example process 400 is described in reference to a suggestion system (e.g., suggestion system 112 as described in reference to FIGS. 1, 2A, and 2B).

The suggestion system receives (402), from an authoring environment, a request to supplement a text segment from an authoring environment. The request can be triggered in the authoring environment by a specified string of characters. The request includes the text segment identified from text content of the authoring environment.

The suggestion system submits (404) a query to a search engine. The suggestion system generates the query from the text segment by designating at least a portion of the text segment as the query. The suggestion system can normalize the portion of the text segment to be included in the query. Normalizing the portion of the text segment can include removing redundant white spaces from the portion of the text segment, capitalizing or uncapitalizing the portion of the text segment, or spell-checking the portion of the text segment.

The suggestion system receives (406) multiple search results from the search engine in response to the query. Each search result includes a URL to an information source and an information snippet. The information snippet can include a summary of the information source. The search results can include numerous result items. The suggestion system can select a subset from the search results.

The suggestion system generates (408) one or more suggestions for supplementing the text segment based on the information snippets. Generating the one or more suggestions based on the result items can include identifying one or more candidate suggestions from each selected information snippet. The one or more candidate suggestions can include terms from non-matching portions of the information snippets (e.g., the non-matching strings as described above). The one or more candidate suggestions will generally include factual information that relates to the text segment or idiomatic phrases including the text segment. The factual information can include at least one of a proper name, a date, or a number. Generating the one or more suggestions based on the result items can further include selecting the one or more suggestions from the one or more candidate suggestions based on a relation score for each of the one or more candidate suggestions. The relation score is an indication of a degree of relatedness between a candidate suggestion and the text segment. The relation score can be used to rank the candidate suggestions. The suggestion system can calculate a relation score for each of the one or more candidate suggestions. Calculating the relation score can include calculating the relation score based on a length of a candidate suggestion, a frequency at which the candidate suggestion appears in the information snippets, a history of the candidate suggestion being selected by a user to supplement the text segment, or a combination of any one or more of the above.

The suggestion system provides (410) the one or more suggestions for supplementing the text segment for display in the authoring environment. Providing the one or more suggestions for supplementing the text segment for display can include providing the one or more suggestions for display in a selection interface. The one or more suggestions can be sorted in the selection interface using the relation score. In some implementations, providing the one or more suggestions for supplementing the text segment for display includes automatically providing at least one of the one or more suggestions for supplementing the text segment for display without requiring a user selection. The one or more suggestions can consist of one particular suggestion. Providing the one or more suggestions for supplementing the text segment for display can include supplementing the text segment using the particular suggestion. In some implementations, the system can receive a user selection of a particular suggestion from among the one or more suggestions displayed in the selection interface and supplementing the text segment using the particular suggestion. Supplementing the text segment includes inserting the particular suggestion into a specified position relative the text segment. The specified position can be a beginning, an end, or anywhere between the beginning and the end of the text segment. For example, the suggestion system receives a request to fact check a sentence "The World Wide Web was invented by Tim Berners-Lee and Robert Metcalfe." The request includes a writer selecting the sentence for fact checking, while a cursor is placed at various places of the sentence (e.g., between "invented" and "by," between "by" and "Tim," or between "Robert" and Metcalfe"). The system can respond with suggestions (e.g., "by Tim Berners-Lee and Robert Cailliau," "Tim Berners-Lee and Robert Cailliau," or "Cailliau") to be inserted at position of the cursor.

In some implementations, the system learns from the user selection. Learning from the user selection can include remembering a user's selection of a suggestion to be associated with a text segment. Remembering the user's selection of a suggestion is done anonymously without tracking the user's identity. For example, the system can increase a relatedness value between the first portion of the information snippet and the particular second portion. The system can use the relatedness value as a factor in future calculations of relation scores.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method executed by a computing device, comprising:
receiving a text segment and a request to supplement the text segment from an authoring environment, wherein the text segment is a partial sentence from a free-form text entry comprising a plurality of sentences entered into a text editor of the authoring environment, and wherein the request to supplement the text segment is received in response to an indicator, wherein the indicator is a combination of keystrokes entered by an author, signaling a request for suggestions;
submitting a query to a search engine, the query being generated from the text segment;
receiving a plurality of search results from the search engine in response to the query, each search result including an information snippet based on an information source corresponding to the search result;
generating one or more suggestions for supplementing the text segment from the information snippets, including:
generating one or more candidate suggestions from each information snippet, wherein each candidate suggestion for supplementing the text segment includes a portion of a corresponding information snippet, the information snippet including the text segment and the candidate suggestion including a non-matching part of the information snippet, wherein the non-matching part is determined based on determining a position of the indicator relative to the text segment and identifying a portion of the information snippet that corresponds to a position of the indicator relative to the text segment, and wherein the one or more candidate suggestions each include factual information that relates to the text segment;
calculating a relation score for each of the one or more candidate suggestions, wherein the relation score represents a likelihood that the particular candidate suggestion, when presented, will be selected by a user to supplement the text segment, and wherein calculating the relation score includes calculating the relation score based on a weighted combination of a length of each candidate suggestion, a frequency with which the candidate suggestion appears in the information snippets, and a history of the candidate suggestion being selected by a user to supplement the text segment; and
generating the one or more suggestions from the candidate suggestions according to the relation score; and
providing the one or more suggestions for supplementing the text segment for display in the authoring environment.

2. The method of claim 1, wherein the indicator includes a specified string of characters.

3. The method of claim 1, wherein the one or more suggestions consist of one particular suggestion; and wherein providing the one or more suggestions for supplementing the text segment for display comprises supplementing the text segment using the particular suggestion.

4. The method of claim 1, wherein providing the one or more suggestions for supplementing the text segment for display comprises providing the one or more suggestions for display in a selection interface, the one or more suggestions being sorted in the selection interface using the relation score.

5. The method of claim 4, further comprising:
receiving a user selection of a particular suggestion from among the one or more suggestions displayed in the selection interface; and supplementing the text segment using the particular suggestion.

6. The method of claim 5, wherein supplementing the text segment includes inserting the selected particular suggestion into a specified position relative to the text segment.

7. The method of claim 6, further comprising:
increasing a relatedness value between the text segment and the selected particular suggestion, the relatedness value to be used in future calculations of relation scores.

8. The method of claim 1, wherein the one or more suggestions include at least one of a proper name, a date, or a number.

9. The method of claim 1 wherein the information snippets corresponding to the one or more suggestions comprise a matching part that matches the text segment and the non-matching part, wherein the one or more suggestions comprise a respective non-matching part from the corresponding information snippets.

10. The method of claim 1 wherein the text segment is a part of a sentence, and the one or more suggestions complete the sentence.

11. A computer program product tangibly stored on a non-transitory storage device, the product configured to cause one or more processors to perform operations comprising:
receiving a text segment and a request to supplement the text segment from an authoring environment, wherein the text segment is a partial sentence from a free-form text entry comprising a plurality of sentences entered into a text editor of the authoring environment, and wherein the request to supplement the text segment is received in response to an indicator, wherein the indicator is a combination of keystrokes entered by an author, signaling a request for suggestions;
submitting a query to a search engine, the query being generated from the text segment:
receiving a plurality of search results from the search engine in response to the query, each search result including an information snippet based on an information source corresponding to the search result;
generating one or more suggestions for supplementing the text segment from the information snippets, including:
generating one or more candidate suggestions from each information snippet, wherein each candidate suggestion for supplementing the text segment includes a portion of a corresponding information snippet, the information snippet including the text segment and the candidate suggestion including a non-matching part of the information snippet, wherein the non-matching part is determined based on determining a position of the indicator relative to the text segment and identifying a portion of the information snippet that corresponds to a position of the indicator relative to the text segment, and wherein the one or more candidate suggestions each include factual information that relates to the text segment;
calculating a relation score for each of the one or more candidate suggestions, wherein the relation score represents a likelihood that the particular candidate suggestion, when presented, will be selected by a user to supplement the text segment, and wherein calculating the relation score includes calculating the relation score based on a weighted combination of a length of each candidate suggestion, a frequency with which the candidate suggestion appears in the information snippets, and a history of the candidate suggestion being selected by a user to supplement the text segment; and
generating the one or more suggestions from the candidate suggestions according to the relation score; and
providing the one or more suggestions for supplementing the text segment for display in the authoring environment.

12. The product of claim 11, wherein the indicator includes a specified string of characters.

13. The product of claim 11, wherein the one or more suggestions consist of one particular suggestion; and wherein providing the one or more suggestions for supplementing the text segment for display comprises supplementing the text segment using the particular suggestion.

14. The product of claim 11, wherein providing the one or more suggestions for supplementing the text segment for display comprises providing the one or more suggestions for display in a selection interface, the one or more suggestions being sorted in the selection interface using the relation score.

15. The product of claim 14, the operations further comprising:
receiving a user selection of a particular suggestion from among the one or more suggestions displayed in the selection interface; and
supplementing the text segment using the particular suggestion.

16. The product of claim 15, wherein supplementing the text segment includes inserting the selected particular suggestion into a specified position relative to the text segment.

17. The product of claim 16, the operations further comprising:
increasing a relatedness value between the text segment and the selected particular suggestion, the relatedness value to be used in future calculations of relation scores.

18. The product of claim 11 wherein the information snippets corresponding to the one or more suggestions comprise a matching part that matches the text segment and the non-matching part, wherein the one or more suggestions comprise a respective non-matching part from the corresponding information snippets.

19. The product of claim 11 wherein the text segment is a part of a sentence, and the one or more suggestions complete the sentence.

20. A system, comprising:
one or more computers configured to perform operations comprising:
receiving a text segment and a request to supplement the text segment from an authoring environment, wherein the text segment is a partial sentence from a free-form text entry comprising a plurality of sentences entered into a text editor of the authoring environment, and wherein the request to supplement the text segment is received in response to an indicator, wherein the indicator is a combination of keystrokes entered by an author, signaling a request for suggestions;
submitting a query to a search engine, the query being generated from the text segment;
receiving a plurality of search results from the search engine in response to the query, each search result including an information snippet based on an information source corresponding to the search result;
generating one or more suggestions for supplementing the text segment from the information snippets, including:
generating one or more candidate suggestions from each information snippet, wherein each candidate suggestion for supplementing the text segment includes a portion of a corresponding information snippet, the information snippet including the text segment and the candidate suggestion including a non-matching part of the information snippet, wherein the non-matching part is determined based on determining a position of the indicator relative to the text segment and identifying a portion of the information snippet that corresponds to a position of the indicator relative to the text segment, and wherein the one or more candidate suggestions each include factual information that relates to the text segment;

calculating a relation score for each of the one or more candidate suggestions, wherein the relation score represents a likelihood that the particular candidate suggestion, when presented, will be selected by a user to supplement the text segment, and wherein calculating the relation score includes calculating the relation score based on a weighted combination of a length of each candidate suggestion, a frequency with which the candidate suggestion appears in the information snippets, and a history of the candidate suggestion being selected by a user to supplement the text segment; and generating the one or more suggestions from the candidate suggestions according to the relation score; and providing the one or more suggestions for supplementing the text segment for display in the authoring environment.

21. The system of claim 20, wherein the indicator includes a specified string of characters.

22. The system of claim 20, wherein the one or more suggestions consist of one particular suggestion; and wherein providing the one or more suggestions for supplementing the text segment for display comprises supplementing the text segment using the particular suggestion.

23. The system of claim 20, wherein providing the one or more suggestions for supplementing the text segment for display comprises providing the one or more suggestions for display in a selection interface, the one or more suggestions being sorted in the selection interface using the relation score.

24. The system of claim 23, the operations further comprising:

receiving a user selection of a particular suggestion from among the one or more suggestions displayed in the selection interface; and supplementing the text segment using the particular suggestion.

25. The system of claim 24, wherein supplementing the text segment includes inserting the selected particular suggestion into a specified position relative to the text segment.

26. The system of claim 25, the operations further comprising:

increasing a relatedness value between the text segment and the selected particular suggestion, the relatedness value to be used in future calculations of relation scores.

27. The system of claim 20 wherein the information snippets corresponding to the one or more suggestions comprise a matching part that matches the text segment and the non-matching part, wherein the one or more suggestions comprise a respective non-matching part from the corresponding information snippets.

28. The system of claim 20 wherein the text segment is a part of a sentence, and the one or more suggestions complete the sentence.

* * * * *